UNITED STATES PATENT OFFICE.

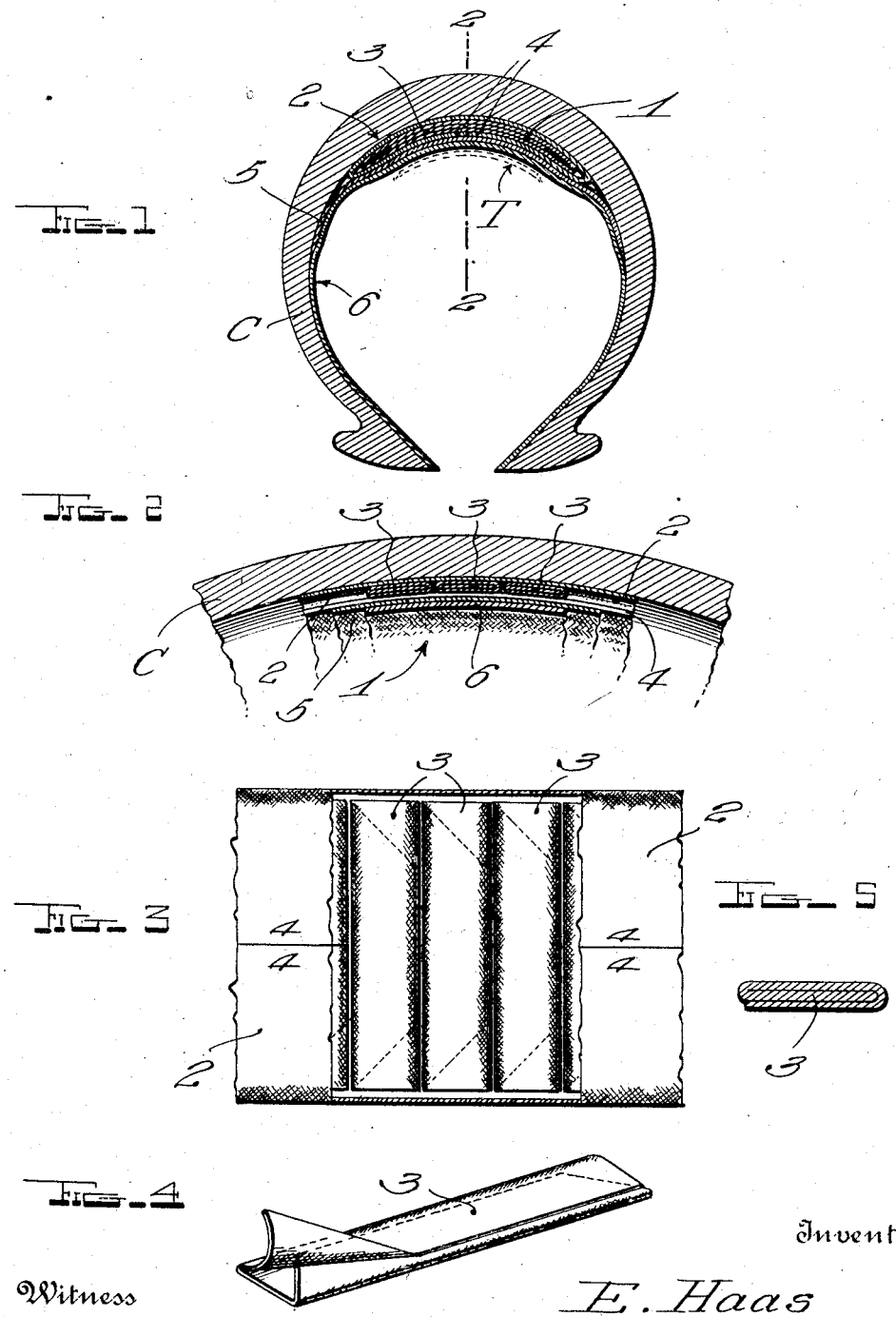

EDWARD HAAS, OF SAN ANTONIO, TEXAS.

PNEUMATIC-TIRE PROTECTOR.

1,259,856. Specification of Letters Patent. Patented Mar. 19, 1918.

Application filed April 5, 1917. Serial No. 159,964.

*To all whom it may concern:*

Be it known that I, EDWARD HAAS, a citizen of the United States, residing at San Antonio, in the county of Bexar and State of Texas, have invented certain new and useful Improvements in Pneumatic - Tire Protectors; and I do declare the following to be a full, clear, and exact description of the invention, such as will enable others skilled in the art to which it appertains to make and use the same.

My invention relates to protectors for pneumatic tires and more particularly to that class of protectors which are adapted to be used as tire liners to serve as a guard interposed between the inner tube and the tire casing to prevent the puncture of the inner tube.

The principal object of my invention is to provide a device of this character which is secured to the inner surface of the tire casing and is composed of a material which permits of the requisite flexibility in the tire liner.

Another object of my invention is to provide a device of this character in which the liner is constructed of a viscous material which is so disposed as to hinder and prevent the penetration therethrough of articles that will puncture the inner tube.

A further object of my invention is to provide a device of this character which is cheap to manufacture, and is constructed entirely of material which is non-metallic and will thereby produce the least wear upon the parts of the tire itself while producing the best results.

With these and other general objects in view which will appear from the description, my invention consists in the novel construction, combination and arrangement of parts to be more fully hereinafter described and claimed and taken in connection with the accompanying drawings which form part of this application, and in which, Figure 1 is a sectional view of a tire casing with my protector applied thereto;

Fig. 2 is a longitudinal central section on the line 2—2 of Fig. 1;

Fig. 3 is a bottom plan view of my protector, parts thereof being broken away;

Fig. 4 is a perspective of one of the guard members; and,

Fig. 5 is a sectional view illustrating the manner of folding the members.

Briefly described, my invention comprises substantially a liner for tire casings composed of an annular series of spaced, transversely extending, outer flexible guard members inclosed within a casing, which is secured to the inner surface of the tire casing along the tread portion. These guard members are constructed in the preferred embodiment of my invention of fabric strips folded upon themselves and secured by means of the viscous cement or glue which will form a tough pliable material which is highly efficient in preventing penetration therethrough of nails and other sharp pointed objects.

Referring more particularly to my invention, and describing the same in detail, reference is had to the accompanying drawings in which like reference numerals indicate like parts. In this embodiment of my invention I have illustrated the ordinary tire casing C in which is disposed the inflated inner tube T with my improved tire protector comprising a liner 1 inserted between the tire casing and the inner tube along the tread portion of the tire.

The liner comprises in detail an annularly disposed strip of fabric 2 on which are disposed a series of transversely extending guard members 3. A strip 2 is adapted to be placed along the tread portion of the tire casing between the casing and the inner tube and has its side edges 4 folded around the ends of the members 3 and bent inwardly toward each other to form a casing for the guard members 3. These guard members and their casing are secured to the tread portion of the inner surface of the tire casing C by means of a strip 5 of any suitable fabric such as heavy canvas, cemented or otherwise secured to the tire casing to maintain the liner in the tread portion of the inner surface of the casing. Secured over this strip 5 is an additional strip 6 of rubberized fabric which is also cemented or otherwise suitably secured to the tire casing and superimposed over the strip 5. This strip of rubberized fabric may be dispensed with if desired and is merely provided as an additional cushioning means between the inner tube and tire liner.

The guard members 3 are composed of strips of heavy canvas or any suitable fabric which are twice folded upon themselves and secured in such relation with the side edges of the middle folds extending inwardly by means of a viscous cement or glue which is thoroughly coated thereover and interposed between the layers formed by the folding of the strip, and which will impregnate the fabric to form tough pliable strips which are transversely arranged with respect to the tire, with their side edges substantially in contact with one another but spaced sufficiently to permit of the longitudinal flexibility of the tire liner when the same is applied.

The covering strip or casing 2 which surrounds these guard members 3 is also constructed of heavy fabric and is glued or cemented in secure relation with the guard members 3 by means of the same viscous material which is used in the construction of the guard members themselves. In like manner, the same material is used on the retaining strip 5 which is also constructed of heavy durable fabric.

By this means, it will be seen that I have provided a liner for tire casings which consists of a series of annularly arranged, transversely extending, guard members and which, owing to the fabric used in this construction, is flexible, and owing to the viscous material of which it is formed, will present a surface that is pliable and which will not crack nor become brittle, and which owing to the thick gum-like constituency of the viscous material coating with the heavy fabric to which it is applied, will form an effective surface to prevent penetration of nails or other sharp pointed objects therethrough.

While I have described and illustrated certain specific materials and details of construction of my improved tire protector, I desire it to be understood that I do not limit myself specifically to the materials and details of arrangement shown and described in this preferred embodiment of my invention, but that any changes may be made in the details of its construction and in the materials used as may fall within the scope of the appended claims.

I claim:—

1. In a tire protector an annular series of rolls, each transversely arranged in relation to the tread of the tire, said rolls being formed of fabric folded upon itself, said fabric being impregnated with a viscous puncture proof binder, the folds of the fabric being held together by said binder, the aforesaid rolls being disposed in a casing and said casing being attached to the inner side of the tire.

2. In a tire protector, an annular series of transversely arranged guard members to be disposed in a tire casing, said members formed of fabric folded upon itself to form rolls, said rolls being so positioned that their edges are in an abutting relation, a strip of flexible material to be disposed between said guard members and the tire casing, the side edges of said strip being folded inwardly around said members to form an enveloping casing therefor, a viscous puncture-resisting binder between said members and the enveloping casing, and means to secure said enveloping casing to the tire casing.

3. In a tire protector a series of rolls formed of fabric folded upon itself, said fabric being impregnated with a puncture proof binder, the folds of said fabric being held together by a viscous puncture proof cement, said rolls being disposed transversely to the tread surface of said tire and inclosed in a casing comprising an annular band to encircle said tire, the edges of said band adapted to meet and completely inclose said rolls, said casing being held in position by a band of fabric cemented to the casing and attached to the tire, and a rubber casing disposed over the last mentioned band and attached to the inner edge of the tire casing.

In testimony whereof I have hereunto set my hand in the presence of two subscribing witnesses.

EDWARD HAAS.

Witnesses:
EDWARD W. SENG,
HENRY C. SCHIFFUS.

Copies of this patent may be obtained for five cents each, by addressing the "Commissioner of Patents, Washington, D. C."